United States Patent [19]

Hosan et al.

[11] Patent Number: 4,785,921
[45] Date of Patent: Nov. 22, 1988

[54] TEMPERATURE-COMPENSATING HYDRAULIC POSITIONER

[75] Inventors: Hans-Josef Hosan, Neuwied; Martin Siemann, Bad Breisig, both of Fed. Rep. of Germany

[73] Assignee: Stabilus GmbH, Koblenz-Neuendorf, Fed. Rep. of Germany

[21] Appl. No.: 815,446

[22] Filed: Dec. 31, 1985

[30] Foreign Application Priority Data

Jan. 16, 1985 [DE] Fed. Rep. of Germany ....... 8500855

[51] Int. Cl.$^4$ ............................................... F16F 9/52
[52] U.S. Cl. ................................... 188/300; 188/276; 92/1
[58] Field of Search .................. 92/1, 13.1, 13.6, 60, 92/166, 183; 91/222, 422, 437; 188/276, 312, 314

[56] References Cited

U.S. PATENT DOCUMENTS

| | | | |
|---|---|---|---|
| 3,060,895 | 10/1962 | Acker et al. | 91/422 X |
| 3,828,651 | 8/1974 | Dorner et al. | 91/422 X |
| 3,893,377 | 7/1975 | Mannetje | 92/60 X |
| 4,099,602 | 7/1978 | Kourbetsos | 188/312 X |
| 4,513,953 | 4/1985 | Molders et al. | 92/1 X |

FOREIGN PATENT DOCUMENTS

| | | |
|---|---|---|
| 2338595 | 2/1975 | Fed. Rep. of Germany . |
| 1022216 | 3/1953 | France ............................... 188/314 |
| 455731 | 10/1936 | United Kingdom . |
| 676254 | 7/1952 | United Kingdom . |
| 726898 | 3/1955 | United Kingdom . |
| 748469 | 5/1956 | United Kingdom . |
| 808934 | 2/1959 | United Kingdom . |
| 1039131 | 8/1966 | United Kingdom . |
| 2004975 | 4/1979 | United Kingdom . |
| 2113798 | 8/1983 | United Kingdom . |

*Primary Examiner*—Robert E. Garrett
*Assistant Examiner*—George Kapsalas
*Attorney, Agent, or Firm*—Brumbaugh, Graves, Donohue & Raymond

[57] ABSTRACT

In a hydraulic positioning device a piston divides the cavity within a cylinder into two working chambers. The piston is connected with a piston rod passing through one end of the device and with a volume compensating rod through the other end of the device. The piston rod is provided with a passage which can be opened and closed by a valve so as to allow optional adjustment and blocking of the piston rod. The hydraulic liquid within the working chambers is subjected to volume variation in response to varying temperatures. With the aim of compensating such volume variations a partition at one end of the cylinder is supported by an abutment of the cylinder through an axially deformable compensating body having preferably a deformation force—deformation path characteristic which is responsive to temperature.

7 Claims, 2 Drawing Sheets

TEMPERATURE-COMPENSATING HYDRAULIC POSITIONER

BACKGROUND OF THE INVENTION

1. Field of the Invention

Hydraulic positioning elements are completely filled with hydraulic fluid for locking the piston definitely in both axial directions when the passage through the piston is closed. On the other hand, the hydraulic fluid is subject to volume variations in response to varying temperatures. In order to prevent excessive pressure within the cylinder when the temperature rises and to prevent incomplete filling of the cylinder with hydraulic fluid when the temperature drops, temperature compensating means are provided.

2. Description of the Prior Art

From British Patent No. 676 254 a hydraulic positioning element is known, where for the compensation of the temperature-caused fluid expansion a compensation chamber is provided which comprises a partition which is axially movable and subject to the action of a return device. This compensation chamber is arranged in a hollow piston rod is in fluid-conducting communication with a working chamber. Thus this hydraulic positioning element is affected by relatively high construction expense.

SUMMARY OF THE INVENTION

It is the object of the present invention to produce a hydraulic positioning element with fluid expansion compensating means of simplied design. A further object is to provide a hydraulic positioning element which possesses high operational reliability as to blocking of the piston. A further object is to reliably compensate for the fluid volume expansion occurring due to heating, without unacceptable pressure rise in the appliance.

In view of at least one of the above objects a hydraulic positioning element comprises a cylinder member having an axis and two end portions, namely a first end portion and a second end portion and a cavity within the cylinder member axially between the first and the second end portions. A first guiding and sealing arrangement is provided at the first end portion and a second guiding and sealing arrangement is provided at the second end portion. A piston rod member extends inwards and outwards of the cavity through the first guiding and sealing arrangement. A piston unit is provided within the cavity and fixed to the piston rod member. This piston unit divides the cavity into two working chambers, a first working chamber adjacent the first end portion and a second working chamber adjacent the second end portion. A volume compensating rod member extends inwards and outwards of the cavity through the second guiding and sealing arrangement and is fixed to the piston rod member for common axial movement therewith. A volume of hydraulic fluid is provided within the first and second working chambers. A fluid passage extends across the piston unit and interconnects the first and the second working chambers for fluid exchange therebetween. Valve means are associated with the fluid passage. Valve means operating means are associated to the valve means for opening and closing the fluid passage means. Fluid expansion compensating means are provided and comprise at least one axially movable partition unit being part of at least one of the first and the second sealing and guiding arrangements and sealed with respect to both the cylinder member and a respective one of the piston rod member and the volume compensating rod member. This partition unit is supported in axial direction through an axially deformable compensating body by abutment means fixed with respect to the cylinder member. Thus a substantial simplification of the hydraulic positioning element is produced, for no additional compensation chamber is necessary. Accordingly, the positioning element consists of few components, is easy to produce and operationally reliable.

In order to avoid the force exerted by the compensating body upon the partition causing a high pressure rise in the working chambers, in accordance with the invention the compensating body has a deformation force-deformation path characteristic which is responsive to temperature. This is achieved especially in that according to one feature of the invention the compensating body comprises an elastomer body. In this case the temperature-dependent return force in achieved by softening of the elastomer body under heat, that is such an elastomer body is relatively rigid at room temperature and well deformable at about 80° C. Accordingly, a pressure of the hydraulic fluid is obtained which is substantially constant over the total operational temperature range.

According to an alternative feature of the invention, the compensating body comprises a spring preferably of adjustable force. Thus the blocking force acting in the direction towards the movable partition can be adjusted precisely. In a simple manner the force adjustment is obtained according to the invention in that for the axial fixing of the compensating body a screw ring is arranged in the cylinder.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will now be explained in greater detail below by reference to the forms of embodiment represented in the drawing, wherein.

DESCRIPTION OF THE PREFERRED EMBODIMENTS

Figure 1:
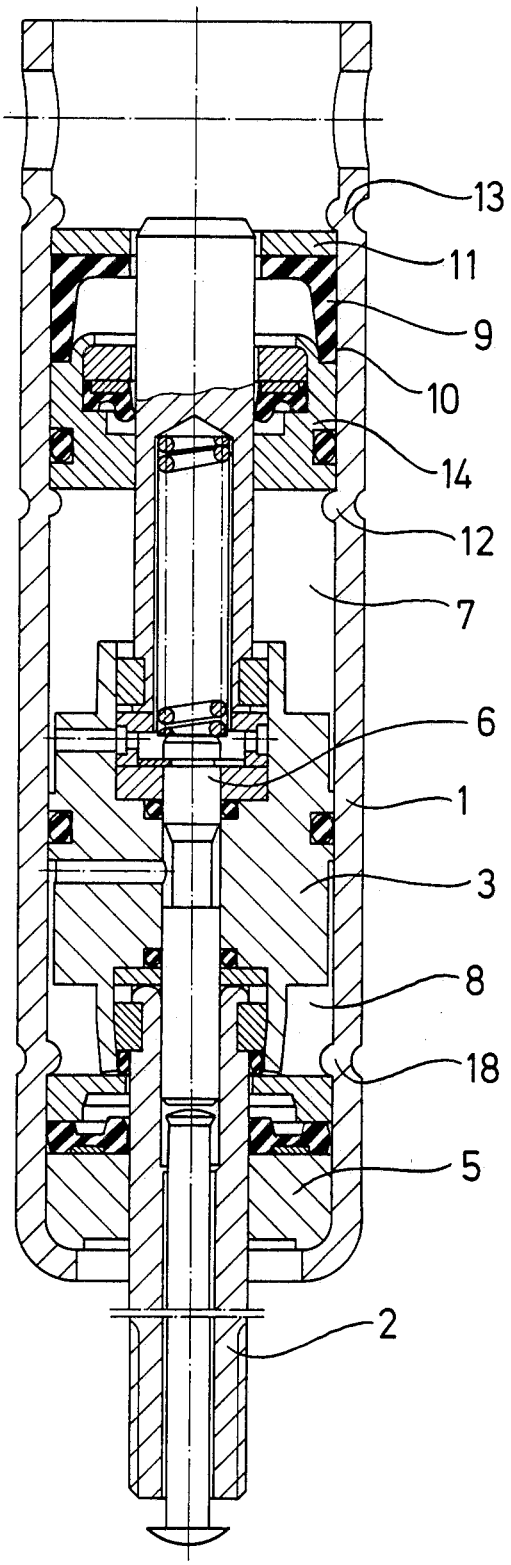
FIG. 1 shows a first embodiment of a positioning element in longitudinal section.

The positioning element as shown in FIG. 1 consists of a cylinder 1 on the inner wall of which there slides a piston 3 connected with a piston rod 2. An extension piece equal in diameter to the piston rod 2 passes through a cylinder end formed as axially movably partition 14 and is sealed off to the exterior by a seal arranged in the axially movable partition 14. At the exit end of the piston rod 2 there are a piston rod guide 5 and a piston rod seal which is pressed by a ring against the piston rod guide 5. The ring, the piston rod seal and the piston rod guide 5 are clamped in between inwardly extending deformations 18 in the cylinder 1 and the crimped-over cylinder end. The interior space of the cylinder 1 is entirely filled with fluid and is divided by the piston 3 into the chambers 7 and 8. A voluntarily operable valve device 6 constitutes the connection between the chambers 7 and 8 through corresponding passages arranged in the piston, on opening of the valve, so that when the valve is opened a relative movement is rendered possible between the unit consisting of piston rod 2 and piston 3 and the cylinder 1. When the valve 6 is closed the connection between the chambers 7 and 8 is shut off and a hydraulic blocking is achieved. The deformations 12 arranged in the cylinder 1 constitute stops for the axial movement for the axially movable partition 14. On the other hand a compensating body 9 acts with the stop face 10 upon this movable partition 14. The compensating body 9 is fixed axially in the cylinder 1 by means of a stop disc 11 and the deformations 13 situated in the cylinder 1.

The compensating body 9 is formed as an elastomer body the temperature-dependently acting return force of which exerts upon the partition 14 a return force which is nearly uniform over the displacement distance of the axially movable partition 14. This is achieved essentially in that the compensating body 9, cosisting of synthetic plastics material or rubber, is relatively rigid at room temperature and becomes softer with rising temperature.

In the form of embodiment according to FIG. 1 the expansion of volume of the fluid in the chambers 7 and 8, occurring as a result of temperature rise, is compensated by axial displacement of the partition 14 against the return force of the compensating body 9. As a result of the temperature-dependent action of the return force of the compensating body 9, on compression of this body no appreciable increase of pressure, if any at all, occurs due to the temperature-caused volume expansion of the fluid and the consequent axial displacement of the partition 14. Correspondingly the pressure in the chambers 7 and 8 does not rise, at least not appreciably, so that the friction behaviour of the piston rod 2 and of the extension piece adapted in diameter to the piston rod is not changed, so that easy displacement is guaranteed in every operational condition when the valve 6 is opened. When the valve 6 is closed the positioning element is blocked absolutely rigidly in the traction direction of the piston rod 2. In the compression direction of the piston rod 2 the blocking is not absolutely rigid, by reason of the axial displaceability of the partition 14 against the flexible compensating body 9. A slight shift takes place if the loading of the partition 14, deriving from the pressure force of the piston rod 2, is greater than the respective return force of the compensating body 9 in condition without load.

Figure 2:
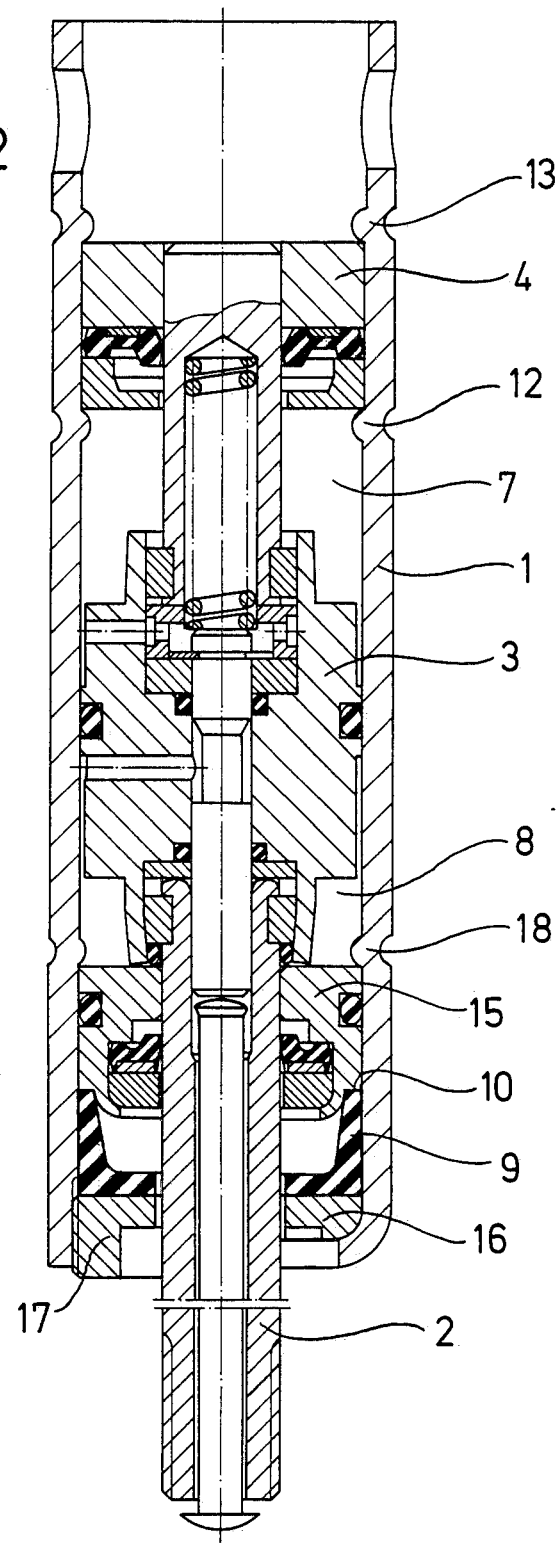
FIG. 2 shows the longitudinal section through a further form of embodiment of a positioning element.

The form of embodiment according to FIG. 2 differs from that according to FIG. 1 essentially in that the extension piece, adapted in diameter to the piston rod 2, passes in sealing manner through a piston end 4, and this piston end 4 is made fast axially immovably between the deformations 12 and 13 situated in the cylinder 1.

On the other hand the piston rod guide forms an axially movable partition 15, the movement of which toward the fluid-filled chamber 8 is limited by deformations 18 in the wall of the cylinder 1. On the other side the compensating body 9 lies with the stop face 10 on the axially movable partition, while in the right half of the Figure for the axial fixing of the compensating body 9 a stop ring 16 is provided which rests on the crimped-over end of the cylinder 1. In the left half of FIG. 2 for this purpose a screw ring 17 is provided which engages in a corresponding internal threading of the cylinder 1 and thus renders possible an exact adjustment of the initial return force of the compensating body 9.

The compensation of the temperture-caused fluid expansion of the fluid situated in the chambers 7 and 8 is effected by axial displacement of the movable partition 15 against the return force of the compensating body 9. In this case when the valve in the piston 3 is closed the positioning element is absolutely rigidly blocked in the pressure direction of the piston rod 2. In the traction direction of the piston rod 2 there is a limitedly elastic blocking which is limited by the axial shiftability of the movable partition 15 against the force of the compensating body 9.

In place of the compensating body 9 formed by an elastomer body a helical compression spring or a spring pack consisting of cup springs can also be used. Admittedly on heating the pressure in the chambers 7 and 8 of the positioning element will rise somewhat, since on axial displacement of the movable partition 15 the springs possess a higher return force according to the spring rating. With such mechanical springs the traction blocking force can be adjusted very precisely by means of the screw ring 17. The corresponding is also valid for the pressure blocking force in the case of the form of embodiment according to FIG. 1.

While specific embodiments of the invention have been shown and described in detail to illustrate the application of the inventive principles, it will be understood that the. invention may be embodied otherwise without departing from such principles.

It is to be noted that the reference numbers in the claims are only provided in view of facilitating the understanding of the claims. These reference numbers are by no means to be understood as restrictive.

What is claimed is:

1. A hydraulic positioning element comprising a cylinder member (1) having an axis and two end portions, namely a first end portion and a second end portion and a cavity (8, 7) within said cylinder member (1) axially between said first and said second end portions;

a first guiding and sealing arrangement at said first end portion and a second guiding and sealing arrangement at said second end portion;

a piston rod member (2) extending inwards and outwards of said cavity (8, 7) through said first guiding and sealing arrangement;

a piston unit (3) within said cavity (8, 7) fixed to said piston rod member (2) and dividing said cavity (8, 7) into two working chambers, a first working chamber (8) adjacent said first end portion and a second working chamber (7) adjacent said second end portion;

a volume compensating rod member extending inwards and outwards of said cavity (8, 7) through said second guiding and sealing arrangement and fixed to said piston rod member (2) for common axial movement therewith;

a volume of hydraulic fluid within said first and said second working chambers (8, 7);

a fluid passage extending across the piston unit (3) and interconnecting said first and said second working chambers (8, 7) for fluid exchange therebetween;

valve means (6) associated with said fluid passage;

valve means operating means associated with said valve means (6) for opening and closing said fluid passage means; and fluid expansion compensating means, said fluid expansion compensating means comprising at least one axially movable partition unit (14, 15) being part of at least one of said first and said second sealing and guiding arrangements and sealed with respect to both said cylinder member (1) and a respective one of said piston rod member (2) and said volume compensating rod member, said partition unit (14, 15) being supported in axial direction through an axially deformable compensating body (9) by abutment means (13, 16, 17) fixed with respect to said cylinder member (1), said compensating body having a deformation force-deformation path characteristic which is responsive to temperature within an operational range between room temperature and about 80° C. so that said compensating body is relatively rigid at room temperature and more deformable at about 80° C.

2. A hydraulic positioning element comprising a cylinder member (1) having an axis and two end portions, namely a first end portion and a second end portion and a cavity (8, 7) within said cylinder member (1) axially between said first and said second end portions;
   a first guiding and sealing arrangement at said first end portion and a second guiding and sealing arrangement at said second end portion;
   a piston rod member (2) extending inwards and outwards of said cavity (8, 7) through said first guiding and sealing arrangement;
   a piston unit (3) within said cavity (8, 7) fixed to said piston rod member (2) and dividing said cavity (8, 7) into two working chambers, a first working chamber (8) adjacent said first end portion and a second working chamber (7) adjacent said second end portion;
   a volume compensating rod member extending inwards and outwards of said cavity (8, 7) through said second guiding and sealing arrangement and fixed to said piston rod member (2) for common axial movement therewith;
   a volume of hydraulic fluid within said first and said second working chambers (8, 7);
   a fluid passage extending across the piston unit (3) and interconnecting said first and said second working chambers (8, 7) for fluid exchange therebetween;
   valve means (6) associated with said fluid passage;
   valve means operating means associated with said valve means (6) for opening and closing said fluid passage means; and
   fluid expansion compensating means, said fluid expansion compensating means comprising at least one axially movable partition unit (14, 15) being part of at least one of said first and said second sealing and guiding arrangements and sealed with respect to both said cylinder member (1) and a respective one of said piston rod member (2) and said volume compensating rod member, said partition unit (14, 15) being supported in axial direction through an axially deformable compensating body (9) by abutment means (13, 16, 17) fixed with respect to said cylinder member (1), said compensating body having a deformation force-deformation path characteristic which is responsive to temperature within an operational range between room temperature and about 80° C., such that the pressure of the hydraulic fluid is substantially constant over the operational temperature range.

3. A hydraulic positioning element as set forth in claim 1 or 2, said compensating body (9) comprising a spring member.

4. A hydraulic positioning element as set forth in claim 1 or 2, said abutment means (17) being axially adjustable, said abutment means having no sealing function so as to be axially adjustable without an influence on a sealing function.

5. A hydraulic positioning element as set forth in claim 4, said abutment means (17) comprising an axially adjustable screw member in screw engagement with said cylinder member (1).

6. A hydraulic positioning element as set forth in claim 1 or 2, said partition unit (15) being part of said first guiding and sealing arrangement.

7. A hydraulic positioning element as set forth in claim 1 or 2, said partition unit (14) being part of said second guiding and sealing arrangement.

* * * * *